(12) United States Patent
Jang

(10) Patent No.: US 7,453,773 B2
(45) Date of Patent: Nov. 18, 2008

(54) METHOD OF ELIMINATING HOME-IN NOISE IN OPTICAL DISC DRIVE BY USING VARIABLE STEP COUNTER

(75) Inventor: Jae-bum Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 720 days.

(21) Appl. No.: 10/734,134

(22) Filed: Dec. 15, 2003

(65) Prior Publication Data

US 2004/0125706 A1 Jul. 1, 2004

(30) Foreign Application Priority Data

Dec. 18, 2002 (KR) .................. 10-2002-0081033

(51) Int. Cl.
*G11B 21/08* (2006.01)

(52) U.S. Cl. .................................. 369/30.14

(58) Field of Classification Search .............. None
See application file for complete search history.

(56) References Cited

U.S. PATENT DOCUMENTS

| 4,627,043 | A | * | 12/1986 | Uehara | 369/215.1 |
| 4,644,514 | A | * | 2/1987 | Ohshima et al. | 369/30.27 |
| 5,222,054 | A | * | 6/1993 | Muraoka et al. | 369/30.15 |
| 5,566,148 | A | * | 10/1996 | Takahara et al. | 369/30.16 |
| 5,608,702 | A | * | 3/1997 | Yano et al. | 369/53.22 |
| 5,661,705 | A | * | 8/1997 | Kunikata et al. | 369/44.28 |
| 6,445,649 | B1 | * | 9/2002 | Saito et al. | 369/30.1 |
| 2004/0190437 | A1 | * | 9/2004 | Sun et al. | 369/30.27 |

FOREIGN PATENT DOCUMENTS

| CN | 85101944 | 1/1987 |
| CN | 1147131 | 4/1997 |
| CN | 1264894 | 8/2000 |
| JP | 8-96535 | 4/1996 |
| KR | 1998-0015954 | 11/1998 |

* cited by examiner

*Primary Examiner*—Tan X Dinh
(74) *Attorney, Agent, or Firm*—Staas & Halsey LLP

(57) ABSTRACT

A method of eliminating home-in noise of an optical disc drive without a home limit switch and using a variable step counter, includes: resetting the variable step counter, which counts steps of a stepping motor of an optical pickup, to zero regardless of a position of the optical pickup, when power is applied to the optical disc drive; driving a servomechanism at the position of the optical pickup and then reading a sub-code value of the optical disc to confirm a current position of the optical pickup; calculating a number of tracks from the current position of the optical pickup to a home position and converting the number of tracks into a step counter value to obtain a step counter value of the home position; and moving the optical pickup to the home position through an access operation. The step counter value of the home position is an integer varying depending on the position of the optical pickup when power is applied.

13 Claims, 8 Drawing Sheets

METHOD OF ELIMINATING HOME-IN NOISE IN OPTICAL DISC DRIVE BY USING VARIABLE STEP COUNTER

CROSS-REFERENCE TO RELATED APPLICATIONS

This application claims the priority of Korean Patent Application No. 2002-81033, filed on Dec. 18, 2002, in the Korean Intellectual Property Office, the disclosure of which is incorporated herein in its entirety by reference.

BACKGROUND OF THE INVENTION

1. Field of the Invention

The present invention relates to a method of eliminating home-in noise generated when an optical pickup of an optical disc drive is moved to a home-in position. More particularly, the present invention provides a method of eliminating noise generated during home-in of an optical pickup in an optical disc drive using a variable step counter and having no home limit switch.

2. Description of the Related Art

As is known, optical discs are generally classified into two familes: compact discs (CDs); and digital versatile discs/digital video discs (DVDs) suitable for multimedia use.

Optical disc drives use an optical pickup to radiate a laser beam onto an optical disc rotated by a spindle motor, and to detect a laser beam reflected from the optical disc, in order to record data onto and/or read data from the optical disc.

As shown in FIG. 1, an optical disc drive 100 includes a spindle motor 110 which rotates an optical disc 130, an optical pickup 120, and a stepping motor 140 which drives the optical pickup 120. The optical pickup 120 includes a focusing actuator (not shown) which is used to focus a laser light beam onto a recording surface of the optical disc 130, and a tracking actuator (not shown) by which the focused laser beam is able to follow tracks on the optical disc 130. Since the tracking actuator has a limited range of movement, the tracking actuator uses the stepping motor 140 to move the optical pickup over larger distances. In general, the optical disc drive 100 includes a step counter (not shown) which counts steps associated with the operation of the stepping motor 140.

When power is applied to the optical disc drive 100, it performs a home-in operation to move the optical pickup 120 to an initial position in order to set a movement start point. The type home-in operation depends on the type of the optical disc drive 100. For example, when the optical disc drive 100 includes a home limit switch, the optical pickup 120 moves up to a home position at which the home limit switch is turned on. In contrast, when the optical disc drive 100 does not include a home limit switch, the optical pickup 120 is moved into contact with an outer wall of the spindle motor 110 where a value of the step counter is reset to zero in order to return to a home position, so that an absolute value of the step counter corresponding to a physical position of the optical pickup 120 corresponds to the stepping motor 140.

As described above, when power is applied to the optical disc drive 100, the optical disc drive 100 generally performs a home-in operation before a requested operation such as, for example, reading or recording.

When the optical disc drive 100 includes a home limit switch, the optical pickup 120 is easily controlled to return to a home position. However, the home limit switch may complicate the configuration of the optical disc drive 100 and increase the cost of manufacturing the optical disc drive 100.

In order to solve these problems, the related art suggests a method of moving the optical pickup into and against an outer wall of a spindle motor and setting a step counter value of a step motor to zero. Without the forced clash of the optical pickup against the spindle motor, the exact position of the optical pickup is not known, and thus an absolute step counter value cannot correspond to the position of the optical pickup. Thus, the forced clash is used to obtain the absolute step counter value corresponding to the position of the optical pickup.

Home-in noise is generated by the forced clash of the optical pickup against the spindle motor. In an optical disc drive using a fixed step counter depending on the position of the optical pickup, such home-in noise cannot be avoided.

As used herein, a forced home-in refers to a method of forcibly clashing an optical pickup against an outer wall of a spindle motor to reset a step counter during application of power, and then moving the optical pickup to a home position. As used herein, direct home-in refers to a method of allowing an optical pickup to directly move to a home position without clashing against an outer wall of a spindle motor when a tray is opened. The forced home-in and the direct home-in are performed in an optical disc drive without home limit switch.

Initial operations of the optical disc drive to which power is applied will now be described.

1. Set input and output ports of a microcomputer for controlling the optical disc drive, initialize an interrupter and a timer of the microcomputer, reset a digital signal processor (DSP), arrange flags necessary for a servo, and initialize each part such as the DSP, the servo, and the like.

2. Attempt a forced home-in in a micro step mode or a half step mode in order to allow a step counter value to correspond to the position of the optical pickup. Move the optical pickup to an inner circle by about 3000 micro steps (40 mm), which generates home-in noise. Reset the step counter value to zero. Depending on the type of the optical disc drive, the optical pickup may move to an outer circle to find a home position (00:02:00 where the step counter value is about 214) or stay at the inner circle position. Depending on the type of the optical disc drive, the optical pickup may try a forced home-in when a tray is opened and closed, so as to reduce noise. In this case, noise from the tray covers forced home-in noise. However, noise generated when the tray is opened and closed may be problematic.

3. Perform automatic adjustment, read table of contents (TOC) to obtain information on the optical disc drive, and calculate a linear velocity, a track pitch, and so forth.

4. Finish lead-in and then enter a pause mode.

As described above, in an optical disc drive without home limit switch, a step counter value corresponding to the physical position of an optical pickup is determined as an absolute value, and thus noise caused by forced home-in cannot be avoided. In other words, since the step counter value does not vary depending on the position of the optical pickup during application of power, noise is generated during the forced home-in.

In most optical disc drives, after the optical disc drive is driven, an optical pickup always moves to a home position and then a tray (direct home-in) is opened, since the home position is always a basis. The direct home-in is achieved by two methods. The first method is to move the optical pickup to the home position through an access of the optical disc drive. The other method is to move the optical pickup by steps corresponding to a value obtained from subtraction of a step counter value in the home position from a step counter value in a current position and then open the tray.

The aforementioned methods of direct home-in are not without problems. The first method has a problem in that since the optical pickup moves through the access, a fail of the access may delay opening the tray. The problem of the second method is that only large step-out and deviation of a step motor are checked during a long-term access test. Of course, since most optical disc drives have a routine to check step-out, a step counter value is recalculated when step-out occurs. However, in a case where a slight step-out occurs and a fixed step counter is used in the second method, an optical pickup goes to another position instead of going to a home position, or does not properly perform direct home-in when a tray is opened. The access test may not be properly performed due to a difference of the position of the optical pickup from a step counter value. These problems result from mapping a step counter value corresponding to the position of the optical pickup to an absolute, fixed value.

SUMMARY OF THE INVENTION

The present invention provides a method of eliminating noise generated during home-in of an optical pickup in an optical disc drive using a variable step counter and having no home limit switch generating a signal during home-in of the optical pickup, so as to meet consumers' demands for low noise and the cost of manufacturing the optical disc drive.

The present invention also provides a method of eliminating home-in noise in an optical disc drive using a variable step counter by which when slight step-out (deviation) is not checked during a long-term access test of an optical disc drive, a step counter value of a home position can be periodically calculated to ensure the stability of an access operation, and an optical pickup can always move to a home position (00:02:00) when a tray is opened after the optical disc drive is driven, to improve the reliability and stability of the optical disc drive.

Additional aspects and/or advantages of the invention will be set forth in part in the description which follows and, in part, will be obvious from the description, or may be learned by practice of the invention.

According to an aspect of the present invention, there is provided a method of eliminating home-in noise of an optical disc drive without a home limit switch and using a variable step counter. The variable step counter, which counts steps of a stepping motor of an optical pickup, is reset to zero regardless of a position of the optical pickup, when power is applied to the optical disc drive. A servomechanism is driven at the position of the optical pickup, and then a sub-code value of the optical disc is read to confirm a current position of the optical pickup. A number of tracks from the current position of the optical pickup to a home position is calculated and the number of tracks is converted into a step counter value to obtain a step counter value of the home position. The optical pickup is moved to the home position through an access operation. The step counter value of the home position is an integer varying depending on the position of the optical pickup when power is applied.

When a disc is not loaded into the optical disc drive, the optical pickup may not move to the home position but stay at the current position when power is applied to the optical disc drive.

The method may further include resetting an initial position of the optical pickup and thereafter accessing one of a 00:03:00 area when a 12 cm disc is a CD and 30000 h when the 12 cm disc is a DVD, the 12 cm disc is loaded into the optical disc drive, and the optical pickup is located in a data area of the 12 cm disc, in compliance with a speed profile based on information on a current position of the optical pickup and a table of contents (TOC) area, and moving the optical pickup a distance toward an inner perimeter of the 12 cm disc until the optical pickup is located in the data area of the 12 cm disc in no good (NG) of a focus when the optical pickup is located around an outer perimeter of the 12 cm disc, and then performing an access operation.

The method may further include resetting an initial position of the optical pickup and thereafter accessing one of a 00:03:00 area when an 8 cm disc is a CD and 30000 h when the 8 cm disc is a DVD, and the 8 cm disc is loaded into the optical disc drive, in compliance with a speed profile based on information on a current position of the optical pickup and a table of contents (TOC) area, determining whether a disc is loaded when the optical pickup is near an outer perimeter of the 8 cm disc, after initial application of power, to force the optical pickup to the data area, and performing an accessing operation.

The method may further include calculating a new home position when the optical pickup accesses the optical disc a threshold number of times by calculating a number of tracks from a current position of the optical pickup to a home position, converting the calculated number of tracks into a converted step counter value, and subtracting a current step counter value from the converted step counter value.

According to still another embodiment of the present invention, there is provided a method of eliminating home-in noise of an optical disc drive without a home limit switch and using a variable step counter, comprising: resetting the variable step counter, which counts steps of a stepping motor of an optical pickup, to zero regardless of a position of the optical pickup, when power is applied to the optical disc drive; confirming a current position of the optical pickup; calculating a step counter value of a home position; and moving the optical pickup to the home position through an access operation.

According to yet another aspect of the present invention, there is provided an optical disc drive comprising: an optical pickup having a stepping motor; a resettable variable step counter which counts steps of the stepping motor of the optical pickup; a servomechanism which drives the optical pickup at a current position to enable reading of sub code data to confirm the current position of the optical pickup; a calculator which calculates a number of tracks from a current position of the optical pickup to a home position and converts the number of tracks into a step counter value of the home position. The variable step counter is reset when the optical disc drive is energized.

According to yet another aspect of the present invention, there is provided a method of eliminating home-in noise in an optical disc drive using a variable step counter by which when slight step-out (deviation) is not checked during a long-term access test of an optical disc drive, comprising: periodically calculating a step counter value of a home position to ensure the stability of an access operation; and moving the optical pickup to the home position after the optical disc drive is driven and the tray is opened.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
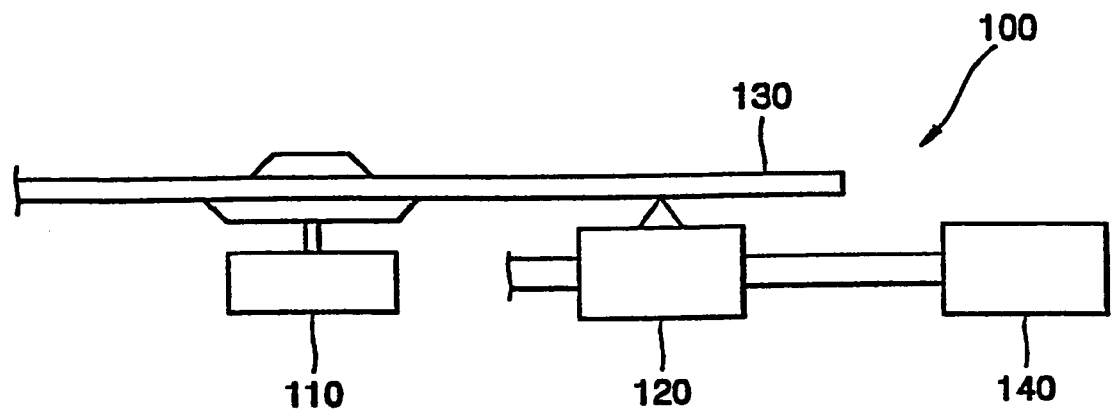
FIG. 1 schematically shows the configuration of a conventional optical disc drive.

Reference will now be made in detail to embodiments of the present invention, examples of which are illustrated in the accompanying drawings, wherein like reference numerals refer to the like elements throughout. The embodiments are described below to explain the present invention by referring to the figures.

Hereinafter, a method of eliminating home-in noise in an optical disc drive using a variable step counter according to embodiments of the present invention will be described in detail with reference to the attached drawings. For clarity and conciseness, detailed explanations of known technologies related to the present invention will be omitted.

Figure 2:
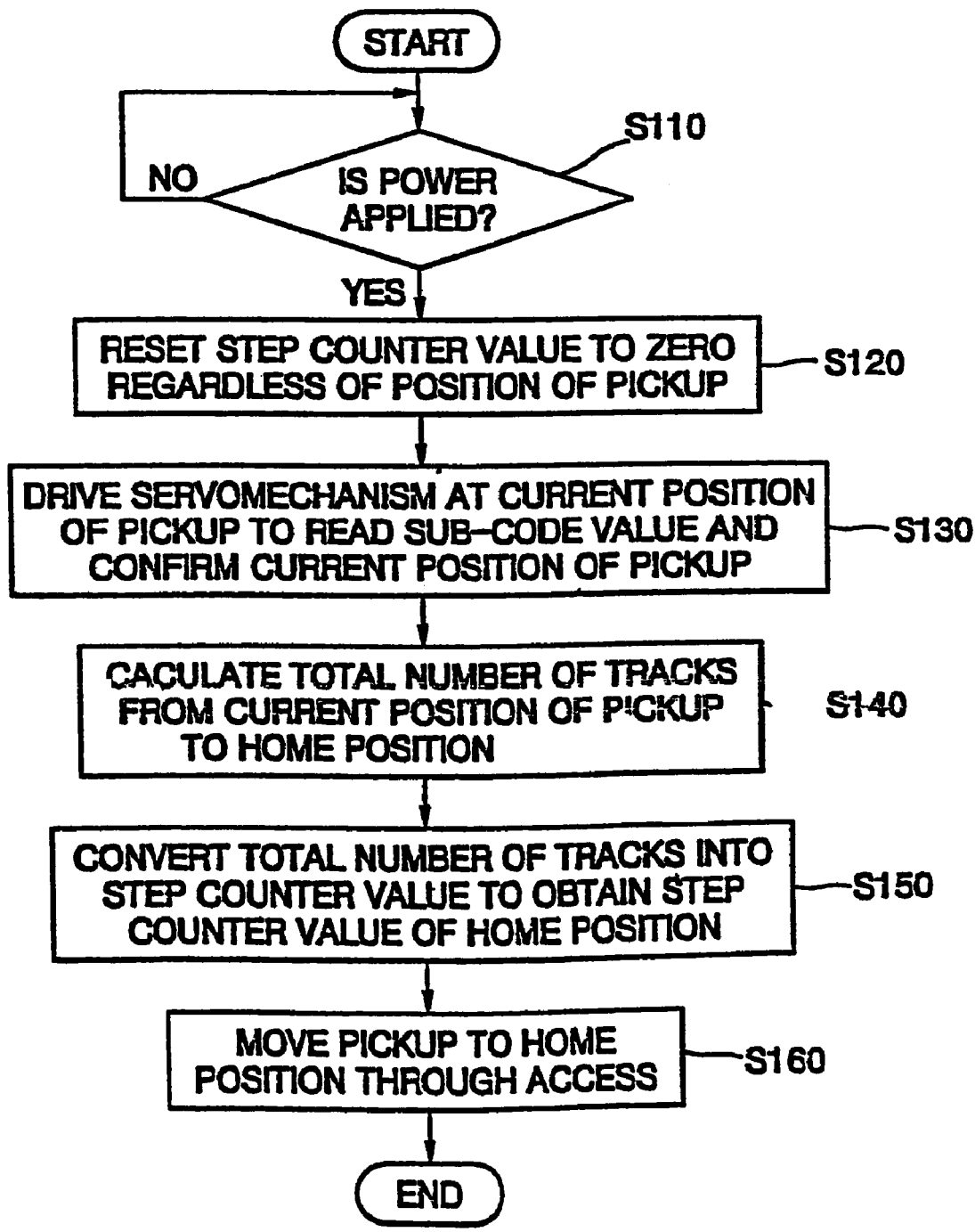
FIG. 2 is a flowchart of a method of eliminating home-in noise in an optical disc drive using a variable step counter, according to an embodiment of the present invention.
Figure 3:
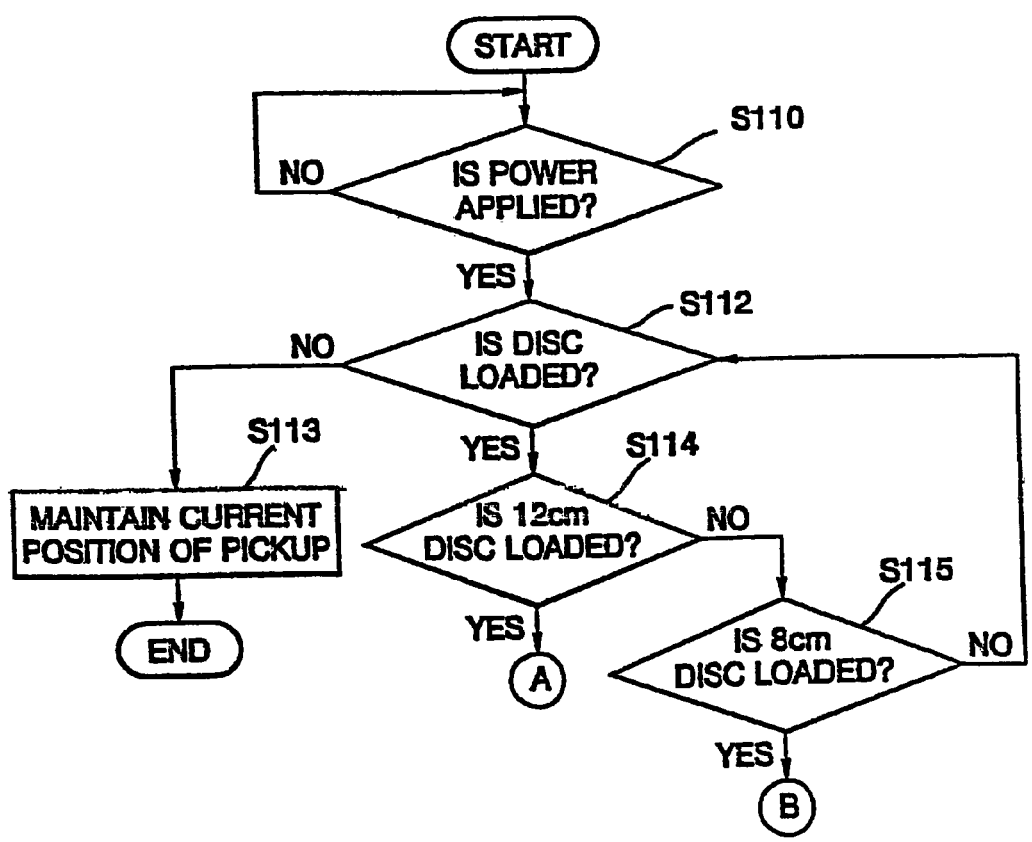
FIG. 3 is a flowchart of operation S110 of the method of FIG. 2.
Figure 4A:
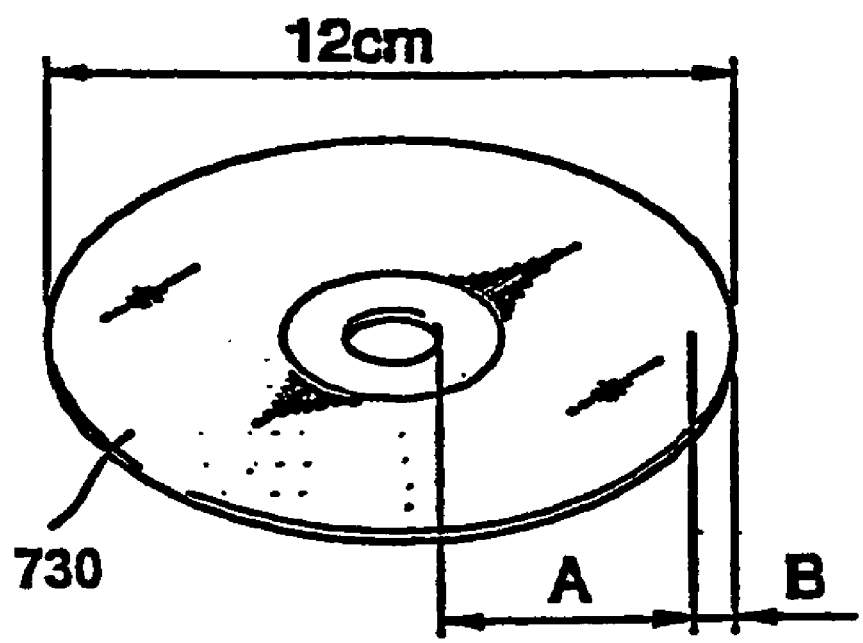
FIG. 4A shows a 12 cm disc.
Figure 4B:
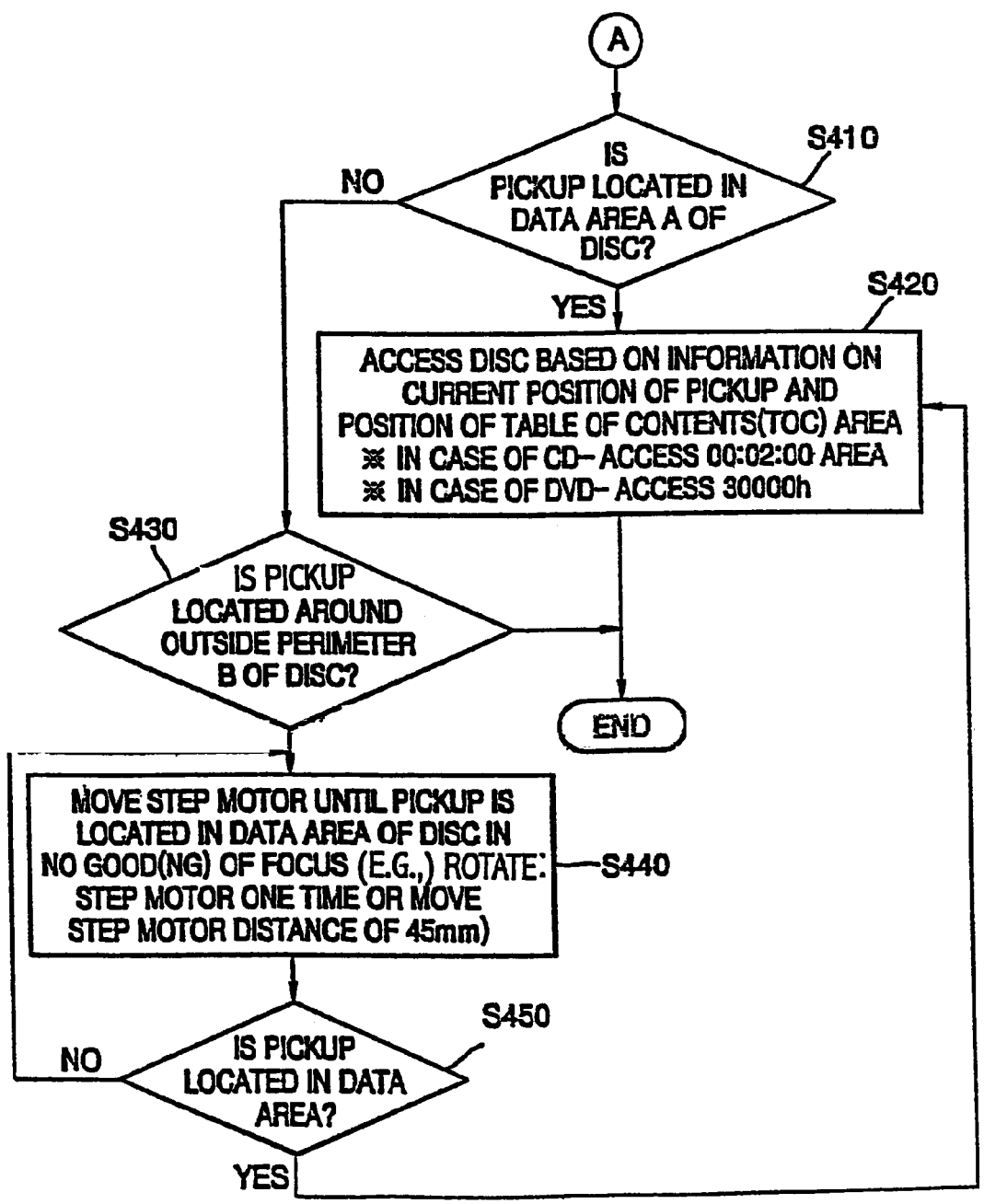
FIG. 4B is a flowchart of operations of FIG. 3.
Figure 5A:
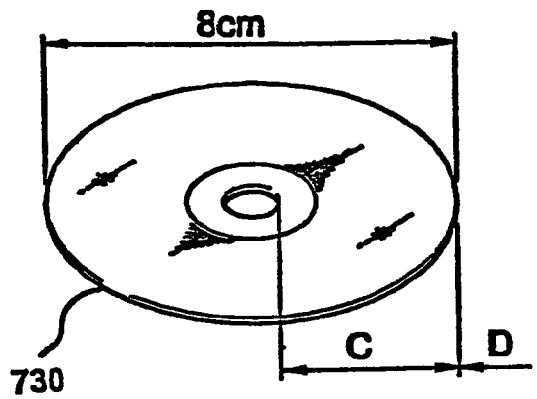
FIG. 5A shows an 8 cm disc.
Figure 5B:
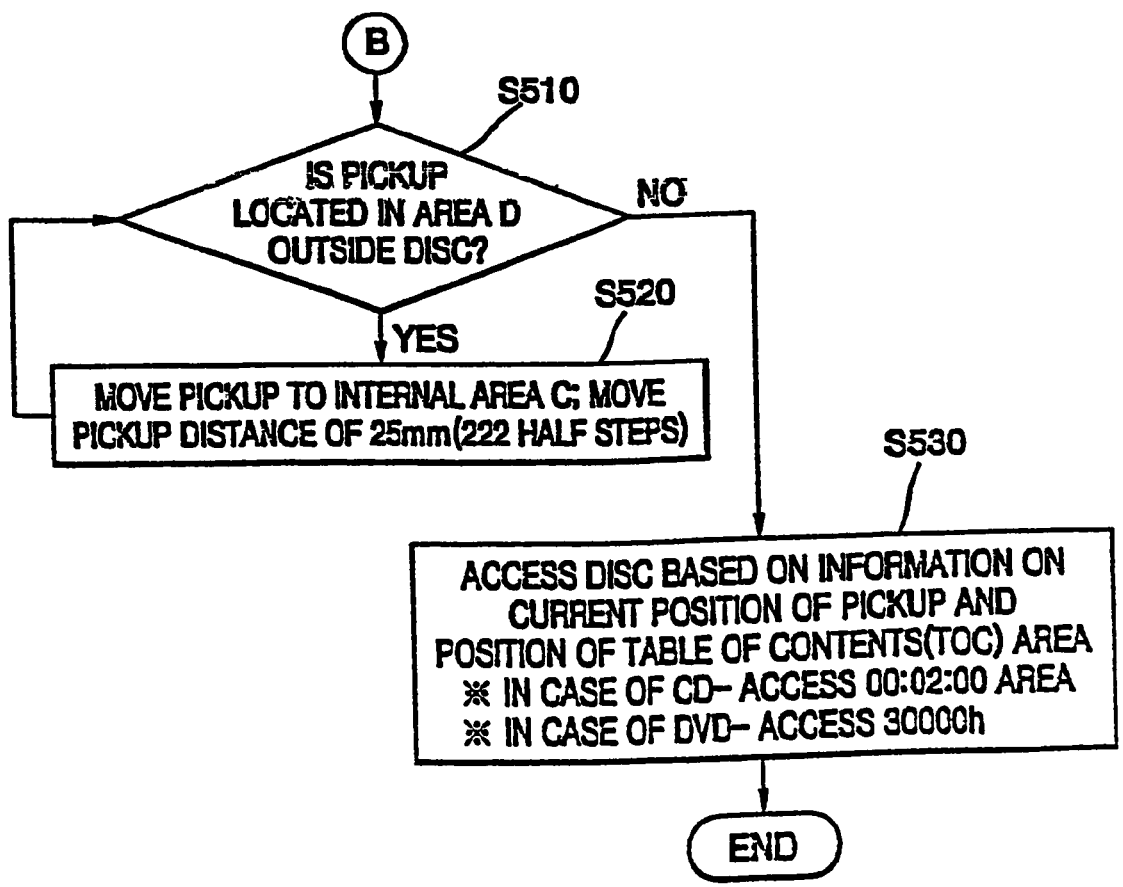
FIG. 5B is a flowchart of operations of FIG. 3.
Figure 6:
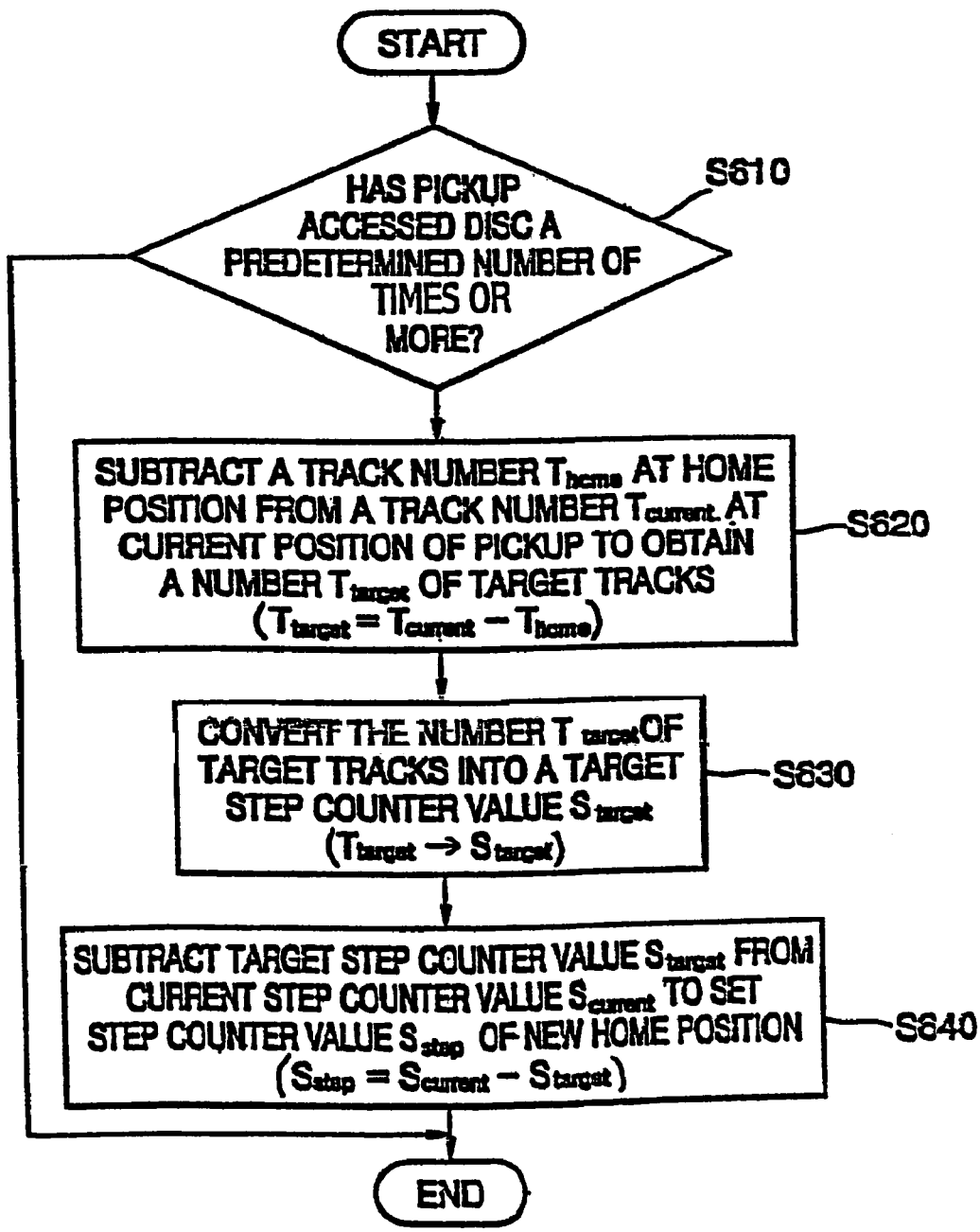
FIG. 6 is a flowchart of a method of eliminating home-in noise in an optical disc drive using a variable step counter according another embodiment of the present invention.
Figure 7:
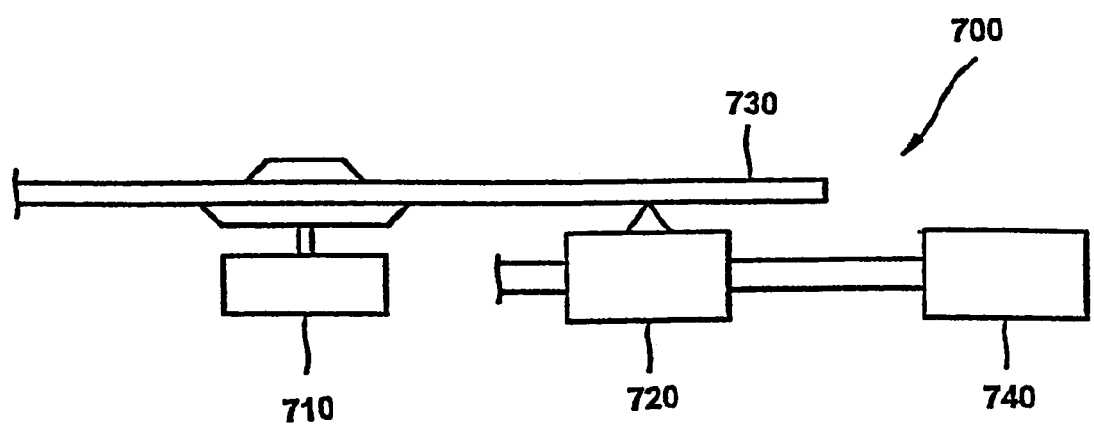
FIG. 7 schematically shows the configuration of an optical disc drive according to an embodiment of the present invention.

FIG. 2 is a flowchart of a method of eliminating home-in noise of an optical disc drive using a variable step counter according ot a first embodiment, and FIG. 3 is a flowchart of step 110 of FIG. 2. FIG. 4B is a flowchart of operations S410-S450 of the method of FIG. 3 when a 12 cm disc is used. FIG. 5B is a flowchart of operations S51-S530 of the method of FIG. 3 when an 8 cm disc is used. FIG. 6 is a flowchart of a method of eliminating home-in noise of an optical disc drive using a variable step counter according to another embodiment of the present invention. FIG. 7 schematically shows the configuration of an optical disc drive according to an embodiment of the present invention.

According to various embodiments of the present invention, home-in noise can be eliminated by variably using a variable step counter instead of a fixed step counter.

A first embodiment of the present invention will now be described with concurrent reference to FIGS. 2 and 7. In operation S110, a determination is made as to whether power is applied to the optical disc drive 700 of FIG. 7 (i.e., whether the optical disc drive is energized). If it is determined that power is applied to the optical disc drive in operation S110, in operation S120, a step counter (not shown) is reset to zero regardless of the position of the optical pickup 720 of FIG. 7. In operation S130, the optical disc drive 700 drives a servo-mechanism (not shown) at a current position of the optical pickup 720 to read a sub-code value of the optical disc 730 and confirm the current position of the optical pickup 720.

In operation S140, the optical disc drive 700 calculates a total number of tracks from the current position of the optical pickup 720 to a home position. In operation S150, the total number of tracks is converted into a step counter value which becomes a step counter value of the home position. The step counter value of the home position may be a variable integer. In other words, the step counter value of the home position varies depending on the position of the optical pickup 720 during the application of power to the optical disc drive 700.

In operation S160, the optical disc drive 700 moves the optical pickup 720 to the home position through a disc accessing operation.

Hereinafter, the method of the present embodiment of the present invention will be explained in detail for when there is no loaded disc, a 12 cm disc, and an 8 cm disc.

Referring to FIGS. 3 and 7, after power is applied in operation S110, in operation S112, a determination is made as to whether a disc is loaded into the optical disc drive 710. If no disc is loaded in the optical disc drive 710, in operation S113, the optical pickup 720 stays in a current position instead of going to a home position, regardless of the current position of the optical pickup 720.

If a disc is loaded in the optical disc drive 710, in operation S114, a determination is made as to whether the disc is a 12 cm disc. If the disc is 12 cm disc, operations S410-S450 shown in FIG. 4B are performed. Referring to FIG. 4, in operation S410, a determination is made as to whether the optical pickup 720 is located in a data area A of the 12 cm disc 730 shown in FIG. 4A. If the optical pickup 720 is located in the data area A of the 12 cm disc 730, in operation 420, the optical disc drive 700 accesses a 00:02:00 area, in the case of a CD, or 30000 h, in the case of a DVD, in compliance with a speed profile based on information on the current position of the optical pickup 720 and the position of a TOC area. Operation S120 of FIG. 2 is performed prior to operation S410.

In operation S430, a determination is made as to whether the optical pickup 720 is positioned around an external perimeter B (shown in FIG. 4A) of the 12 cm disc 730 on which data is not recorded. If so, the optical disc drive 700 rotates the step motor one time (a distance of about 4.5 mm) toward an inside perimeter of the 12 cm disc 730, i.e., toward the data area A (shown in FIG. 4A) of the 12 cm disc 730, until the optical pickup 720 is positioned in the data area A of the 12 cm disc 730 in no good (NG) of a focus. In operation 450, a determination is made as to whether the optical pickup 720 reaches the data area A of the 12 cm disc 730. If the optical pickup 720 reaches the data area A, operation S420 is performed.

When the disc 730 is a 12 cm disc with an 8 cm data area, the optical disc drive 700 performs operation S420 when the optical pickup 720 is located within the 8 cm data area. When the optical pickup 720 is located beyond the 8 cm data area, the optical disc drive 700 measures a radio frequency ripple peak (RFRP) value to discern the data area from a non-data area. If there is no data, the optical disc drive 700 moves the optical pickup 720 by 11.3 mm (100 half steps) inwardly to minimize shock and noise during home-in of the optical pickup 720. Even in this case, if there is no data, the optical disc drive 100 moves the optical pickup 720 by 9.1 mm (170 half steps) inwardly.

In operation S115, a determination is made whether an 8 cm disc is loaded into the optical disc drive 100 after power is applied to the optical disc drive 100. If an 8 cm disc is loaded into the optical disc drive 100, operations S510-S530 shown in FIG. 5B are performed. Referring to FIG. 5, in operation S510, a determination is made as to whether the optical pickup 720 is located in an area D outside the 8 cm disc. If the optical pickup 720 is located in the area D, in operation S520, the optical disc drive 700 determines only one time whether the 8 cm disc is loaded, in order to move the optical pickup 120 to an internal circumference of 25 mm (222 half step). When the optical pickup 720 is located in the area C inside the 8 cm disc, in operation S530, the optical disc drive 700 applies a servo to access a 00:02:00 area, in the case of a CD, or 30000 h, in the case of a DVD, in compliance with a speed profile based on information on the current position of the optical pickup 720 and the position of the table of contents (TOC) area.

Accordingly, in the first embodiment of the present invention, although an optical disc drive does not include a home limit switch, the optical disc drive is operable without generating home-in noise.

Slight step-out and deviation may occur during a long-term access test in an optical disc drive. The related art suggests performing a direct home-in using a fixed step counter to address the slight step-out and deviation. The optical pickup may fail to go to home position or the fixed step counter may be entangled, which may result in an unstable access operation. In order to solve these problems, the present embodiment of the present invention periodically (once every 10 accesses, for example) calculates a step counter value of home position so that an access operation is stably performable and the optical pickup is movable to a home position when a tray is opened.

Operation S150 of FIG. 2 will be explained in detail with concurrent reference to FIGS. 6 and 7. In operation S610, a determination is made as to whether the optical pickup 720 has accessed a disc a number of times or more, e.g., 10 times or more. If the optical pickup 720 accesses the disc the number of times or more, in operation S620, the optical disc drive 700 calculates a number, $T_{target}$, of target tracks by subtracting a number, $T_{home}$, of a track at a home position from a number, $T_{current}$, of a track at a current position of the optical pickup 720. The calculation of the number, $T_{target}$, of target tracks is performed once every 10 accesses to the disc. In operation S630, the number $T_{target}$ is converted into a target step counter value $S_{target}$. In operation S640, a step counter value $S_{step}$ of a new home position is obtained by subtracting the target step counter value $S_{target}$ from a current step counter value $S_{current}$.

The step counter value $S_{step}$ is calculable by the following Equations 1, 2, and 3:

$$T_{target} = T_{current} - T_{home} \quad (1)$$

$$T_{target} \rightarrow S_{target} \quad (2)$$

$$S_{step} = S_{current} - S_{target} \quad (3)$$

The calculation of the step counter value $S_{step}$ of the new home position is due to the variability of the step counter with respect to the position of the optical pickup 720.

Accordingly, by periodically, e.g., once every 10 accesses, calculating a step counter value of a home position, slight step-out and deviation is checkable during an access test. In addition, the optical pickup is movable to the home position when the tray is opened. As a result, the optical disc drive is reliably and stably operable.

As described above, in a method of eliminating home-in noise of an optical disc drive using a variable step counter according to an embodiment of the present invention, although the optical disc drive does not include a home limit switch, the optical disc drive is operable without generating home-in noise. As a result, users' demands for low noise are satisfiable and the cost of manufacturing the optical disc drive is reducible due to the omission of the home limit switch.

In addition, when unchecked slight step-out and deviation occur during a long-term access test of the optical disc drive, a step counter value of a home position periodically calculable to ensure the stability of an access operation. Moreover, after the optical disc drive is driven and the tray is opened, the optical pickup is movable to the home position (00:02:00). As a result, the reliability and stability of the optical disc drive is improved.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined by the claims and their equivalents.

What is claimed is:

1. A method of eliminating home-in noise of an optical disc drive without a home limit switch and using a variable step counter, comprising:

resetting the variable step counter, which counts steps of a stepping motor of an optical pickup, to zero regardless of a position of the optical pickup, when power is applied to the optical disc drive;

driving a servomechanism at the position of the optical pickup and then reading a sub-code value of the optical disc to confirm a current position of the optical pickup;

calculating a number of tracks from the current position of the optical pickup to a home position and converting the number of tracks into a step counter value to obtain a step counter value of the home position; and moving the optical pickup to the home position through an access operation, wherein the step counter value of the home position is an integer varying depending on the position of the optical pickup when power is applied.

2. The method of claim 1, wherein the home position is 00:02:00.

3. The method of claim 1, wherein, when a disc is not loaded into the optical disc drive, the optical pickup does not move to the home position but stays at the current position when power is applied to the optical disc drive.

4. The method of claim 1, further comprising resetting an initial position of the optical pickup and thereafter accessing one of a 00:03:00 area when a 12 cm disc is a CD and 30000 h when the 12 cm disc is a DVD, the 12 cm disc is loaded into the optical disc drive, and the optical pickup is located in a data area of the 12 cm disc, in compliance with a speed profile based on information on a current position of the optical pickup and a table of contents (TOC) area, and moving the optical pickup a distance toward an inner perimeter of the 12 cm disc until the optical pickup is located in the data area of the 12 cm disc in no good (NG) of a focus when the optical pickup is located around an outer perimeter of the 12 cm disc, and then performing an access operation.

5. The method of claim 1, further comprising resetting an initial position of the optical pickup and thereafter accessing one of a 00:03:00 area when an 8 cm disc is a CD and 30000 h when the 8 cm disc is a DVD, and the 8 cm disc is loaded into the optical disc drive, in compliance with a speed profile based on information on a current position of the optical pickup and a table of contents (TOC) area, determining whether a disc is loaded when the optical pickup is near an outer perimeter of the 8 cm disc, after initial application of power, to force the optical pickup to the data area, and performing an accessing operation.

6. The method of claim 1, further comprising calculating a new home position when the optical pickup accesses the optical disc a threshold number of times by calculating a number of tracks from a current position of the optical pickup to a home position, converting the calculated number of tracks into a converted step counter value, and subtracting a current step counter value from the converted step counter value.

7. The method of claim 6, wherein the home position is 00:02:00.

8. The method of claim 5, further measuring a radio frequency ripple peak (RFRP) value to discern the data area from a non-data area when the optical pickup is located beyond the data area.

9. The method of claim 8, further comprising moving the optical pickup inwardly to minimize shock and noise during home-in of the optical pickup when there is no data.

10. A method of eliminating home-in noise of an optical disc drive without a home limit switch and using a variable step counter, comprising:

resetting the variable step counter, which counts steps of a stepping motor of an optical pickup, to zero regardless of a position of the optical pickup, when power is applied to the optical disc drive;

confirming a current position of the optical pickup;

calculating a step counter value of a home position; and moving the optical pickup to the home position through an access operation.

11. The method of claim 10, wherein the calculating includes calculating a number of tracks from the current position of the optical pickup to the home position and converting the number of tracks into a step counter value to obtain a step counter value of the home position.

12. The method of claim 10, wherein the confirming includes driving a servomechanism at the current position of the optical pickup and then reading a sub-code value of the optical disc to confirm the current position of the optical pickup.

13. The method of claim 10, wherein the step counter value of the home position is an integer varying depending on the position of the optical pickup when power is applied.

* * * * *